Aug. 6, 1957 C. F. BROWNFIELD 2,801,464
CONSTRUCTION OF CAN AND OPENER
Filed Dec. 7, 1956 2 Sheets-Sheet 1
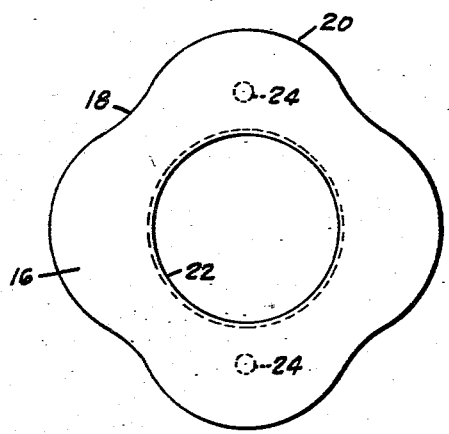
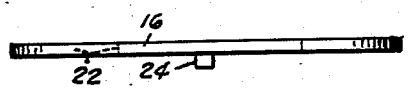
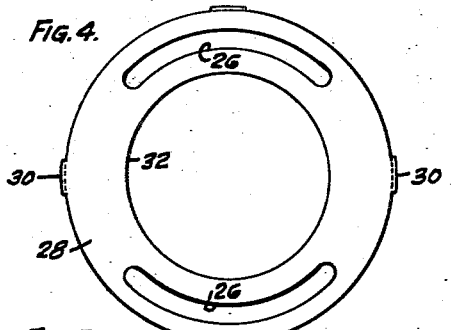
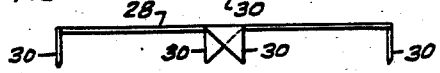
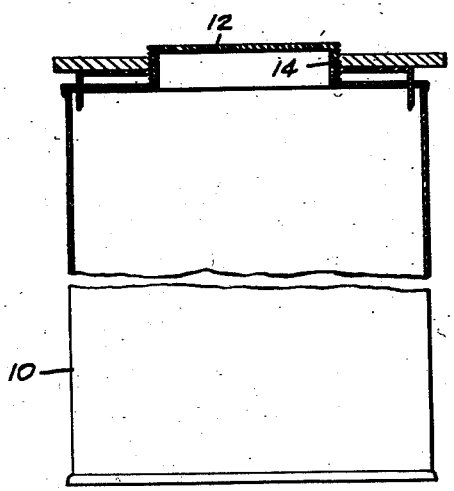
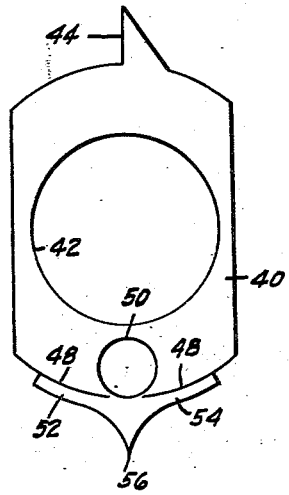
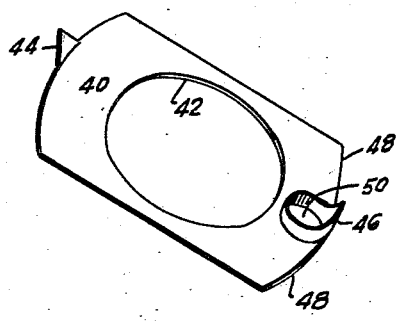
INVENTOR.
CHARLES F. BROWNFIELD
BY
*Harry H. Hitzman*
ATTORNEY.

Aug. 6, 1957 C. F. BROWNFIELD 2,801,464
CONSTRUCTION OF CAN AND OPENER
Filed Dec. 7, 1956 2 Sheets-Sheet 2
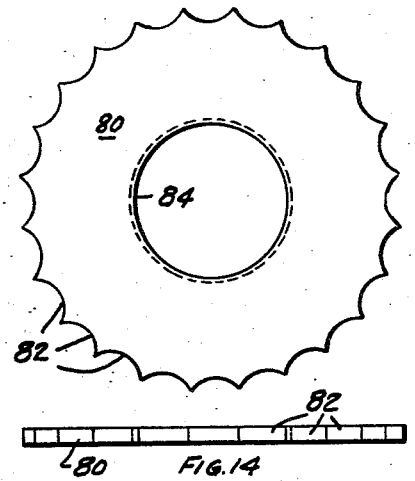
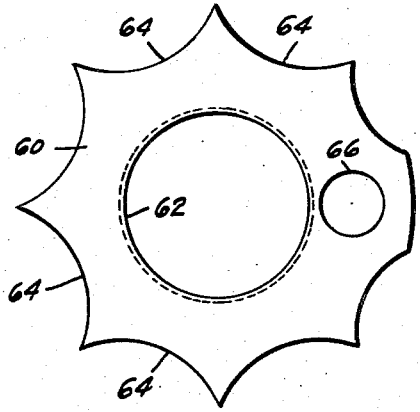
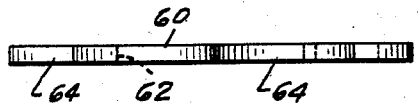
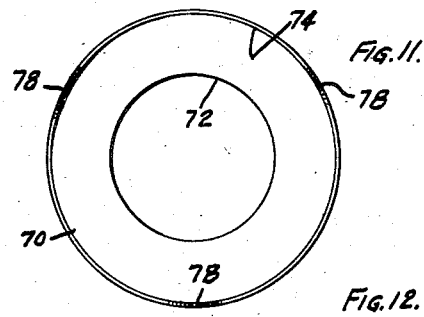
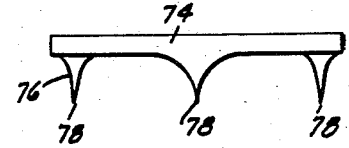
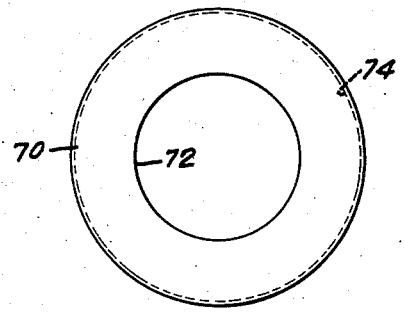
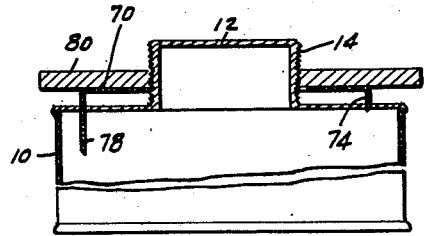
INVENTOR.
CHARLES F. BROWNFIELD
BY
Harry H. Hitzeman
ATTORNEY.

United States Patent Office 2,801,464
Patented Aug. 6, 1957

2,801,464

CONSTRUCTION OF CAN AND OPENER

Charles F. Brownfield, Chicago, Ill.

Application December 7, 1956, Serial No. 626,942

3 Claims. (Cl. 30—17)

My invention relates to improvements in the construction of cans or containers and openers therefor.

My invention relates more particularly to the type of container that must be cut open to permit access to the product therein, and more specifically to a container of this type that is provided with a top cap which is formed with exterior threads.

A further feature of the invention resides in the opening or cutting unit which I have provided which generally comprises a cutter member that is forced into cutting contact by a follower member adapted to be received on the threads of the can cap so that as it is turned down the cutter is moved into action to cut a circular opening in the top of the can.

A further object of the invention is to provide a cutting unit of the type described which may also have as a feature thereof a cutting member capable of producing a small round opening for pouring or drinking and an air entrance opening opposite thereto.

Other objects and advantages will be more apparent from the following description wherein reference is had to the accompanying drawings, upon which:

Fig. 1 is a side elevational view of a container partially in cross-section and showing the cutter member and follower in cross-section thereon;

Fig. 2 is a plan view of the cutter follower which I provide;

Fig. 3 is a side elevational view thereof;

Fig. 4 is a plan view of the cutter member which is capable of being stamped from a flat blank of metal;

Fig. 5 is a side elevational view thereof;

Fig. 6 is a plan view of a modified type of cutter showing the same as it has been stamped from a blank of sheet metal;

Fig. 7 is a perspective view thereof showing the same formed to provide the hole cutting and slit cutting knives thereon;

Fig. 8 is a plan view of the cutter follower which may be used in connection with the cutter shown in Fig. 6;

Fig. 9 is a side elevational view thereof;

Fig. 10 is a plan view of a still further modified form of cutter, which, as will be described, has a continuous circular knife member;

Fig. 11 is a bottom plan view thereof showing the face view of the knife member;

Fig. 12 is a side elevational view of the same;

Fig. 13 is a plan view of a cutter follower used in connection with the cutter shown in Figs. 10 to 12 inclusive;

Fig. 14 is a side elevational view thereof; and

Fig. 15 is a fragmentary side elevational view of a container partially in cross-section showing the cutter member and follower of Figs. 10 to 14 inclusive in conjunction with the same.

In the embodiment of the invention which I have chosen to illustrate and describe the same, in Fig. 1 I have shown a cylindrical container 10 which may be metal, plastic or any other suitable or desirable material that is capable of being cut by a metal cutter member.

The container 10 is formed with a top cap portion 12 provided with exterior threads 14 on the same. The cutter unit may comprise two pieces, a follower member 16 that is comparatively rigid and provided with arcuate grooves 18 and ridges 20 for easy gripping to turn the same. It is also provided with a medially disposed tapped opening 22 which can be screw-threadedly mounted on the exterior threads 14 of the cap 12 of the container 10.

The follower member 16 is also provided with a pair of downwardly projecting pins 24 which enter arcuate slots 26 in the disc member 28. The disc member 28 is preferably made of spring steel or similar material so that several pointed edges may be bent down to form triangularly shaped knife members 30 about the periphery of the same. It also has a medial opening 32 of sufficient size to permit it to be telescoped over the cap 12.

In operation the cutter member 28 is placed over the cap 12 of the container and the follower 16 is screw-threadedly mounted thereon, and as it is turned to move forward on the threads 14, the pin members 24 engage in the slots 26 and with continued downward pressure pierce openings in the top of the container 10 and then are rotated in the same to completely cut the top off. The cutter unit is then removed, carrying the top with it, and the can has been opened by the simple operation just described.

In the embodiment of the invention shown in Figs. 6 and 7, I have provided a cutter member 40 which is especially adapted for use in opening cans or containers that contain liquids that may be drunk from the can if desired. Accordingly the member 40 is provided with a medial opening 42 to fit over the screw-threaded top 12 of the can. A triangularly shaped knife blade 44 is provided at one side and a comparatively circular pointed blade member 46 at the other. The circular knife 46 is made from the blank shown in Fig. 6, the metal being slit along the lines 48 as shown, and the opening 50 also being punched in the blank while flat.

The portions 52 and 54 terminate in a sharp point 56 and this portion of the blank may be bent at right angles to the plane shown in Fig. 6, the metal bent around to form a circle around the opening 50, and a piercing knife has been provided that will cut a round hole in the top of the can so that liquid may either be poured out of the hole or it may be drunk from the same.

The cutter follower which I prefer to use in connection with the cutter shown in Figs. 6 and 7 is shown in Figs. 8 and 9 and may consist of a flat blank 60 which has a screw-threaded medial opening 62 therein adapted to mesh with the threads 14 on the top of the container 10. I also provide the sector shaped peripheral walls 64 for easy gripping to rotate the follower. An opening 66 is provided through the follower 60 which, when the cutter has been turned down to puncture a round opening through the top of the can, can be swung around to overlie the opening so that liquid may be drunk through the same.

In Figs. 10 to 15 inclusive I have shown a cutter 70 which may consist of a flat metal blank that has a circular medial opening 72 therein adapted to loosely fit over the threaded cap 12 of the container. The cutter 70 is provided with a transversely projecting circular blade member 74 which is so formed that it has a cutting edge 76 about its entire periphery, the edge however terminating at a plurality of equally divided points in tapered pointed blade portions 78.

The follower for this knife may be a flat blank 80 provided about its peripheral edge with serrations 82 and having a medial tapped opening 84 for engaging the threads 14 on the container 10. It will be noted that as this cutter and follower is used, the pressure is straight down on the can, the movement of the follower on the threaded cap portion pressing the pointed knife blade portions of the cutter through the metal, piercing the can and then following with a complete cut about the peripheral edge 76 of the container, so that when the downward movement is completed a circular disc will have been cut form the top of the can and be resting on the follower. The top of the can including the circular disc portion will be lifted off, thus providing the open can.

From the above and foregoing description it can be seen that I have provided a unit for piercing or cutting the top from containers simply and expeditiously, a unit that is easily operated due to the pressure that can be obtained by simply rotating the follower 16 on the threads of the top of the can to easily effect a cutting operation.

While I have illustrated and described a specific embodiment and modifications of the invention, it will be apparent to those skilled in the art that changes and modifications may be made in the exact details shown, and I do not wish to be limited in any particular; rather what I desire to secure and protect by Letters Patent of the United States is:

1. A unit for cutting the top from a sealed container that has a cap with exterior threads thereon, said unit comprising a disc member having an opening to fit over said cap, said disc member also having pointed blade portions formed on its periphery, and a follower having a tapped opening adapted to engage the threads on the cap and force the blade portions of the disc member through the top of the container and by continued rotation of the follower cut a circular opening in the top of the container.

2. A unit for cutting the top from a sealed container that has a cap with exterior threads thereon, said unit comprising a disc member having an opening to fit over said cap, said disc member also having pointed blade portions formed on its periphery, and a follower having a tapped opening adapted to engage the threads on the cap and force the blade portions of the disc member through the top of the container and by continued rotation of the follower cut a circular opening in the top of the container, the cut-out portion being attached to the disc member and removable therewith.

3. A unit for cutting the top from a sealed container that has a cap with exterior threads thereon, said unit comprising a disc member having an opening to fit over said cap, said disc member also having pointed blade portions formed on its periphery, and a follower having a tapped opening adapted to engage the threads on the cap and force the blade portions of the disc member through the top of the container and by continued rotation of the follower cut a circular opening in the top of the container, said follower having a periphery including grooves and ridges for easy turning.

References Cited in the file of this patent
UNITED STATES PATENTS

| | | |
|---|---|---|
| 604,878 | Francisco | May 31, 1898 |
| 1,460,845 | Hermani | July 3, 1923 |
| 2,089,907 | Lyons | Aug. 10, 1937 |
| 2,522,420 | Witte et al. | Sept. 12, 1950 |